Dec. 12, 1933.                 E. RITZ, JR                    1,938,723
                              GRINDING MACHINE
                           Filed Oct. 29, 1928          2 Sheets-Sheet 1
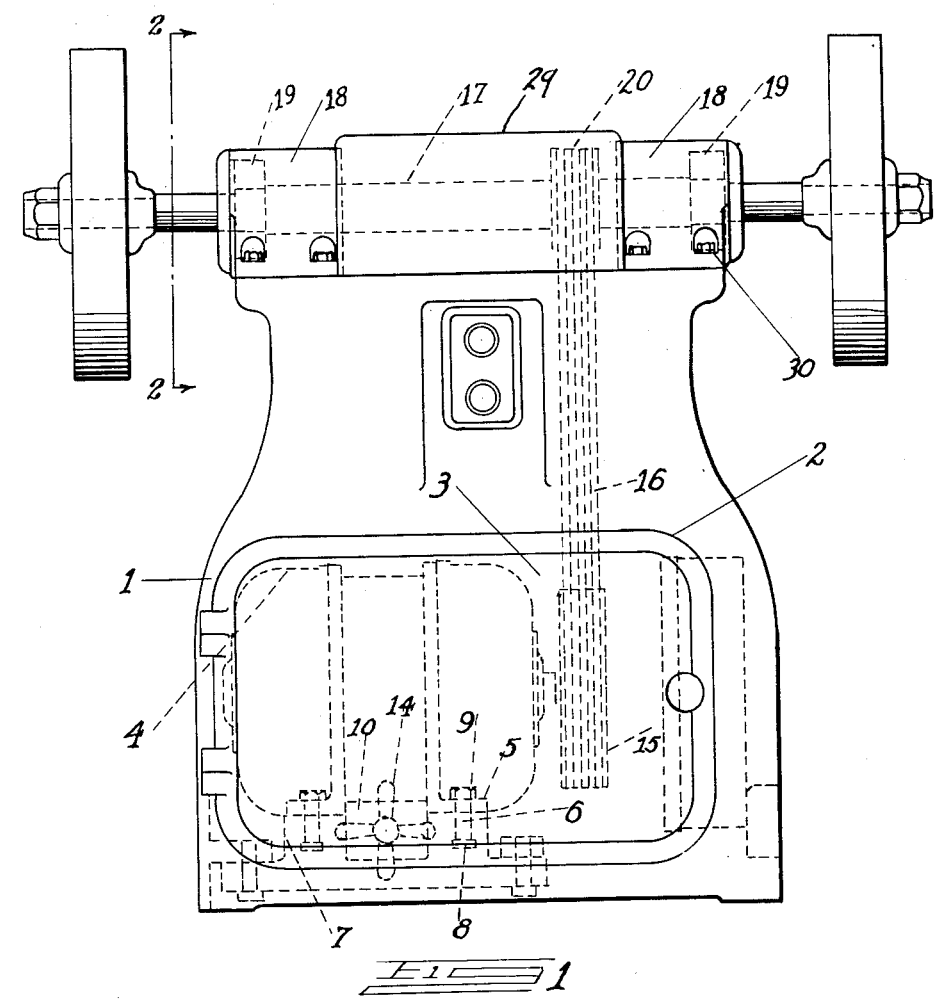
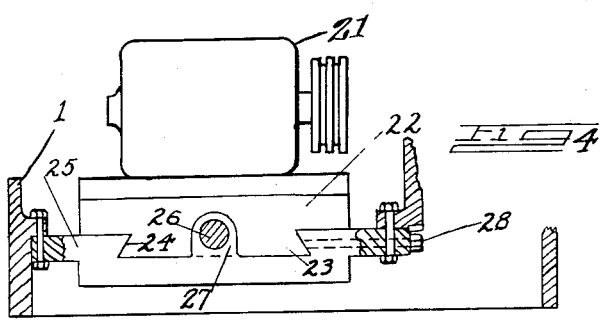

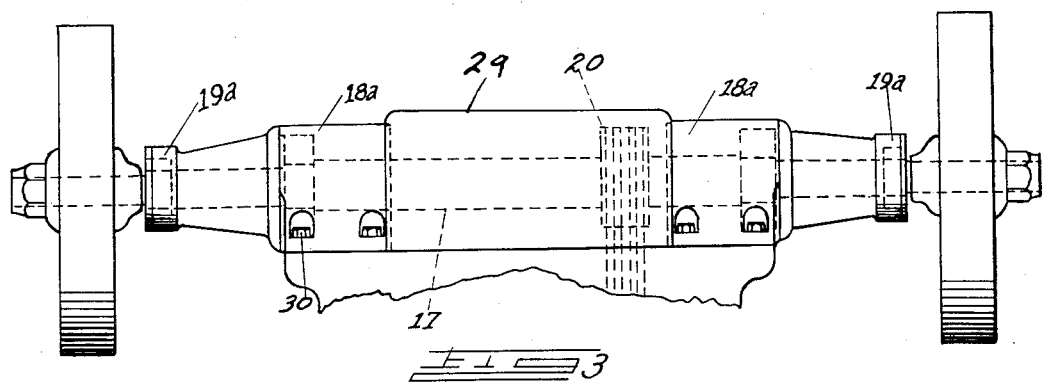
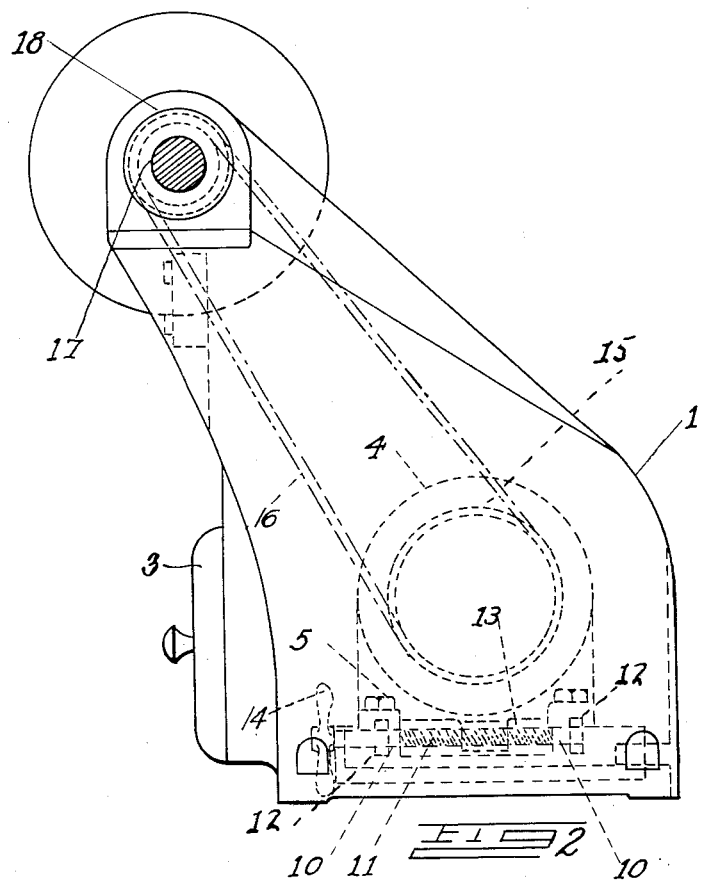

Patented Dec. 12, 1933

1,938,723

UNITED STATES PATENT OFFICE 1,938,723

GRINDING MACHINE

Emil Ritz, Jr., Mount Healthy, Ohio, assignor to The Hisey-Wolf Machine Company, Cincinnati, Ohio, a partnership composed of Walter J. Friedlander and Joseph A. Friedlander, Cincinnati, Ohio Application October 29, 1928. Serial No. 315,724

10 Claims. (Cl. 308—11)

My invention relates to grinders of the type having a belt drive, and has as its primary object the provision of an enclosed motor for driving the grinder shaft belt, which motor is low on the machine, is parallel at all times with the grinder shaft, and which can be easily adjusted to tighten the belt when desired, all of said objects being accomplished in a machine having an enclosed space in which the driving motor is located.

It is a further object of my invention to provide a simple and readily demountable structure for supporting the grinder shaft, such that if the belt comes away or anything happens to the bearings, there will be but little manual work, and no realignment or readjustment of parts required to remove the grinder shaft and replace it again.

These objects and other advantages I accomplish by that certain construction and arrangement of parts to be hereinafter more specifically pointed out and claimed.

In the drawings:—

Figure 1 is a front elevation of my machine.

Figure 2 is a sectional side elevation thereof the section being on the plane of the line 2, 2 of Fig. 1.

Figure 3 is a detail elevation of a modified form of grinder shaft mounting and supporting structure.

Figure 4 is a detail of a different motor mounting structure.

Referring to the embodiment of my machine which I have illustrated to develop the points of my invention, I have shown a grinder having a frame formed of a hollow box-like casing 1, having at the bottom of its front an opening therein at 2, which is closed with a door 3.

The motor 4 for driving the device is provided with the usual base 5, in which are mounted a set of T-headed bolts 6. A mounting plate 7 is bolted to the base of the main frame casting. This plate has T slots therein as indicated at 8, 8 for the four bolts in the motor base. To tighten the motor base on the mounting plate the bolts have nuts 9 thereon which are turned down, thus pulling the T heads up in the mounting plate slots.

There are two cross webs in the mounting plate, as indicated at 10, 10. In these is mounted so as to revolve in holes in said webs, an adjusting screw 11, said screw having a pair of collars 12 thereon to prevent its lengthwise movement.

A threaded boss 13 extending down from the base of the motor engages this screw, and the hand piece 14 formed at the outer end of the screw is used to move the motor to and fro on the mounting plate, when the T bolts are loosened.

The motor shaft has a pulley 15 thereon, which mounts the driving belt 16 for the grinder shaft 17.

Instead of forming the journals for this shaft by split boxes, of which the lower half is fast on the frame and the upper half removable, I have improved the machine very decidedly by making the journals in the form of boxes 18 which are solid instead of split, within which boxes are the bearings and races therefor, indicated generally at 19. The boxes are bolted solidly to the top of the main frame requiring but two flat machine surfaces on the frame.

The grinder shaft has a sheave formed or mounted thereon as at 20 for the driving belt.

As indicated in Figure 3, where the grinder shaft is a long one, the journal boxes 18a are formed with extensions in which additional bearings 19a are mounted, the main bearings being the same as in the first instance.

As shown in Figure 4 is a modified form of motor mounting. In this case the motor 21 has a plate 22 secured to its base, which plate is formed with a dovetail 23, said dovetail fitting slidingly in a dovetail groove 24 in the mounting plate 25 that is bolted to the main frame casing. An adjusting screw 26, arranged non-slidingly in a boss 27 in the mounting plate, and engaging a threaded hole in the plate 22, serves to adjust the position of the motor. A gib screw 28 may be used for locking the position of the plate 22.

In the drawings, a removable cover plate 29 is shown in place over the grinding shaft between the journal boxes.

In operation, the grinding shaft is fitted with the belt before the journals are bolted down by means of their bolts 30 to the frame, and the motor is placed in a position where the belt can be set around the motor shaft pulley. The adjusting screw is then turned to bring the motor forwardly in the base of the frame with the result of tightening of the belt. When the belt is properly tightened the motor can be clamped tightly against moving.

If the belt should slip, and come away from the grinder shaft or should break, the grinder shaft can be removed by unbolting the journals, without interfering in any way with the bearings or their races, and the necessary repairs made, whereupon the journals are replaced again without adjustments, and with the result of placing the grinder shaft back in the exact position which it had in the first place. In the hands of an inexperienced tool builder, there is no course of instruction necessary in connection with the removal and replacement of the grinder shaft, and no chance of getting the bearings out of shape, clamping the journals (as in a split journal) too loosely or too tightly together.

The motor is located close down to the floor, which makes for steadiness; it is enclosed and protected against dirt, chips, and the like, and in its adjustment will always be in its position with its shaft in true parallelism with the grinder shaft. There is nothing to get loose and out of alignment as in tilting types of motors, and I am not aware of any enclosed motor grinder which has the features of ready adjustment, low motor mounting, parallelism maintenance, and freedom from all torsional strain and vibration.

By the term grinder or the like in the claims, I wish to indicate buffing and polishing machinery.

Having thus described my invention, what I claim as new and desire to secure by Letters Patent, is:—

1. In a grinder or the like, the combination of a frame having an enclosed body, a shaft to be driven, horizontally mounted on said frame, a motor slidably mounted upon a horizontal support having a four point suspension within said frame, a flexible driving connection between said motor and said driven shaft and means for adjusting said motor on said support, said driven shaft having bearings supported in demountable positively aligned housings on said frame.

2. In a grinder or the like, the combination of a frame having an enclosed body, a shaft to be driven mounted on a portion of said frame vertically offset from said base, a motor having a flexible member for driving said shaft, said motor mounted at the base of the frame within the enclosed body, and means for adjusting said motor along said base, said driven shaft having bearings supported in demountable positively aligned housings on said frame.

3. In a grinder or the like, the combination of a frame having an enclosed body, a shaft to be driven, horizontally mounted on said frame, abutments within said frame and a motor supporting plate affixed underneath said abutments at four points of suspension, said supporting plate dovetailed, a sliding member on said supporting plate with a portion to enter said dovetailed portion, means on said supporting plate to adjust the position of said sliding member, a motor mounted on said sliding member with its shaft parallel to said driven shaft but offset therefrom vertically and a flexible connection between said motor and said driven shaft, said motor detachably mounted on said sliding member, said driven shaft having bearings mounted in detachable housings positively aligned on said frame.

4. In a grinder or the like, the combination of a frame having a closed body comprising a relatively wide base portion and an upwardly extending portion of progressively less width terminating in a supporting portion offset from said base both horizontally and vertically, a shaft mounted for horizontal rotation on said supporting portion, a motor mounted for horizontal movement on said base, a flexible driving connection between said motor and said shaft, and means for adjustably determining the position of said motor on said base.

5. In a machine of the character described, a frame comprising a relatively wide base and a relatively narrow overhanging upper part, a driven shaft journaled on said upper part, a flexible operative connection, and a motor having a shaft connected to said driven shaft by said operative connection and adjustable substantially horizontally on said base to stretch said operative connection.

6. In a machine of the character described, a frame comprising a relatively wide base and a relatively narrow overhanging upper part, a driven shaft, a journal member continuous around said driven shaft and detachably mounted on said upper part, a flexible operative connection, and a motor having a shaft connected to said driven shaft by said operative connection and adjustable substantially horizontally on said base to stretch said operative connection.

7. In a grinder or the like, a motor comprising a shaft, a driven shaft, said shafts having their axes in a common plane substantially inclined between the horizontal and the vertical, a frame having a relatively narrow part and a relatively wide part and tapering from said wide part to said narrow part along said plane, a flexible operative connection member connecting said shafts, said motor being mounted on said wide part for adjustment at a substantially acute angle to said plane, to stretch said operative connection member.

8. In a grinder or the like, a frame comprising a base extending upwardly and overhanging forwardly from said base, a motor mounted on said base, a driven shaft journaled in the upper overhanging part of said frame, and a flexible operative connection member connecting said motor and said shaft, said motor being adjustable rearwardly on said base to stretch said operative connection member.

9. In a grinder or the like, a frame comprising a base extending upwardly and overhanging forwardly from said base, a motor mounted on said base, a driven shaft journaled in the upper overhanging part of said frame, and a flexible operative connection member connecting said motor and said shaft, said motor being adjustable rearwardly on said base to stretch said operative connection member, the mounting of said shaft on said frame comprising journals continuous around said shaft and detachably connected to the frame.

10. In a grinder or the like, a frame comprising a base extending upwardly and overhanging forwardly from said base, a motor mounted on said base, a driven shaft journaled in the upper overhanging part of said frame, and a flexible operative connection member connecting said motor and said shaft, said motor being adjustable rearwardly on said base to stretch said operative connection member, the mounting of said shaft on said frame comprising journals continuous around said shaft and detachably connected to the frame, said operative connection member being between said journals.

EMIL RITZ, Jr.